(12) United States Patent
Sanchez et al.

(10) Patent No.: US 11,099,829 B2
(45) Date of Patent: Aug. 24, 2021

(54) METHOD AND APPARATUS FOR DYNAMICALLY DEPLOYING OR UPDATING A SERVERLESS FUNCTION IN A CLOUD ARCHITECTURE

(71) Applicant: VMware, Inc., Palo Alto, CA (US)

(72) Inventors: Sergio Sanchez, Sofia (BG); Radostin Georgiev, Sofia (BG); Angel Ivanov, Sofia (BG); Tina Nakova, Sofia (BG)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/731,617

(22) Filed: Dec. 31, 2019

(65) Prior Publication Data

US 2021/0200527 A1    Jul. 1, 2021

(51) Int. Cl.
*G06F 8/65* (2018.01)
*G06F 8/71* (2018.01)
*G06F 11/10* (2006.01)

(52) U.S. Cl.
CPC ............ *G06F 8/65* (2013.01); *G06F 8/71* (2013.01); *G06F 11/1004* (2013.01)

(58) Field of Classification Search
CPC ........... G06F 8/65; G06F 8/71; G06F 11/1004
USPC ................................................. 717/168–178
See application file for complete search history.

(56) References Cited

U.S. PATENT DOCUMENTS

| | | | | |
|---|---|---|---|---|
| 7,559,059 B2* | 7/2009 | Renaud | ................... | G06F 16/10 717/174 |
| 8,719,809 B2* | 5/2014 | Gokhale | ............. | G06F 11/1433 717/170 |
| 10,379,838 B1* | 8/2019 | Chud | .................... | G06F 11/079 |
| 2012/0324435 A1* | 12/2012 | Somani | ..................... | G06F 8/30 717/170 |
| 2016/0026452 A1* | 1/2016 | Dani | ........................ | G06F 8/65 717/170 |

OTHER PUBLICATIONS

Cheng, Bin, et al. "Fog function: Serverless fog computing for data intensive iot services." 2019 IEEE International Conference on Services Computing (SCC). IEEE, 2019.pp. 28-35 (Year: 2019).*
Saha, Aakanksha, and Sonika Jindal. "EMARS: efficient management and allocation of resources in serverless." 2018 IEEE 11th International Conference on Cloud Computing (CLOUD). IEEE, 2018.pp. 827-830 (Year: 2018).*
Park, Jungae, Hyunjune Kim, and Kyungyong Lee. "Evaluating Concurrent Executions of Multiple Function-as-a-Service Runtimes with MicroVM." 2020 IEEE 13th International Conference on Cloud Computing (CLOUD). 2020.pp. 1-5 (Year: 2020).*

(Continued)

*Primary Examiner* — Satish Rampuria
(74) *Attorney, Agent, or Firm* — Loza & Loza, LLP

(57) ABSTRACT

System and computer-implemented method dynamically deploying serverless functions in a cloud architecture utilize a code execution service to receive a request to trigger execution of a serverless function and to determine deployment status information for a previous serverless function version based on the request. The deployment status information is then used to generate a code execution service command for the code execution service to deploy the serverless function.

20 Claims, 6 Drawing Sheets

(56) References Cited

OTHER PUBLICATIONS

Lee, Hyungro, Kumar Satyam, and Geoffrey Fox. "Evaluation of production serverless computing environments." 2018 IEEE 11th International Conference on Cloud Computing (CLOUD). IEEE, 2018.pp. 442-450 (Year: 2018).*

Christidis, Angelos, et al. "Enabling serverless deployment of large-scale ai workloads." IEEE Access 8 (2020): pp. 70150-70161. (Year: 2020).*

Alpernas, Kalev, et al. "Secure serverless computing using dynamic information flow control." arXiv preprint arXiv:pp. 1802.08984 (2018). (Year: 2018).*

* cited by examiner

METHOD AND APPARATUS FOR DYNAMICALLY DEPLOYING OR UPDATING A SERVERLESS FUNCTION IN A CLOUD ARCHITECTURE

BACKGROUND

Cloud architectures are used in cloud computing and cloud storage systems for offering infrastructure as a service (IaaS) cloud services. Examples of cloud architectures include the VMware Cloud architecture software, Amazon EC2™ web service, and OpenStack™ open source cloud computing service. IaaS cloud service is a type of cloud service that provides access to physical and/or virtual resources in a cloud environment. These cloud services provide a tenant application programming interface (API) that supports operations for manipulating IaaS constructs, such as virtual computing instances (VCIs), e.g., virtual machines (VMs), and logical networks.

In addition to offering IaaS cloud services, cloud computing providers may also offer function as a service (FaaS) cloud services. Examples of FaaS cloud services include AWS Lambda provided by Amazon Web Services, Inc., GCP (Google Cloud Platform) Cloud Functions provided by Google LLC, and Azure Functions offered by Microsoft Corporation. An FaaS cloud service is a computing service that provides a platform allowing development, deployment, and management of application functionalities without the complexity of building and maintaining infrastructure typically associated therewith. The cloud computing provider performs all administration of computing resources, including server and operating system maintenance. In addition, the cloud computing provider offers capacity provisioning and scaling, code monitoring, and logging. Use of FaaS cloud services provides cost savings because a user is charged based only on computing resources used. For example, cost is not incurred when code is not running. In other words, FaaS cloud services provides users the ability to run code efficiently, without provisioning or managing servers. Hence, applications that are built using FaaS cloud services are commonly referred to as "serverless applications." Each serverless application may include one or more code snippets referred to as "serverless functions." In general, a serverless function is described by a serverless function definition that includes program code and attributes for execution of the program code (e.g., library and other dependencies) for the serverless function.

Of course, the services described above may be provided for a private cloud that includes one or more customer data centers (referred to herein as "on-premise data centers"). The services may also be provided for a public cloud that includes a multi-tenant cloud architecture providing IaaS cloud services. The services may further be provided for in a hybrid cloud system. A hybrid cloud system aggregates the resource capability from both private and public clouds to facilitate creation, deployment, maintenance, and utilization of application with minimal effort of access to those capabilities. In other words, a hybrid cloud system abstracts private, on-premises, and public cloud resources and presents them as being available in one continuous, hybrid cloud. Customers can then deploy applications over the resources offered by the hybrid cloud to take advantage of scaling and flexibility.

One type of serverless application that may be implemented using FaaS cloud services is an automation workflow. Running automation workflows in the context of cloud management (i.e., managing cloud resources using automation workflows) is not always a straightforward process. For example, when different cloud computing providers are being used, each cloud computing provider may require different serverless functions in an automation workflow to be executed. To further complicate matters, even where a single cloud computing provider is used, different cloud regions of that cloud computing provider may require execution of different serverless functions in the automation workflow.

In contrast to certain serverless functions in an automation workflow that require execution based on a particular cloud computing provider and/or region, other serverless functions of the automation workflow will need to be executed for any cloud service provider and/or region. For example, a serverless function can be executed on different cloud computing providers. However, that serverless function must first be deployed using a serverless function definition before it becomes executable. Deployment time is proportional to how much code and/or dependencies a serverless function definition has, with increased deployment time required when the serverless function definition has more code and/or dependencies.

In most cases, identity of which cloud computing provider or region a serverless function definition of an automation workflow will need to be deployed is not known until the automation workflow is triggered by a request. In effect, deployment of the serverless function definition needs to be "on demand" because the automation workflow dynamically selects the cloud computing provider and/or region after being triggered. One significant problem caused by this dynamic selection scenario is that any deployment may unnecessarily add a delay to the automation workflow process. This result goes against the intent behind the serverless functions paradigm, which is that serverless functions should be lightweight and fast.

Once a serverless function definition has been deployed, any issues with the serverless function will require an update of the serverless function definition and/or the configuration associated therewith. In order for the update to be present for any subsequent executions, the serverless function definition also needs to be updated in the cloud computing provider and region. Similar to the dynamic selection scenario issues noted above, any unnecessary delay due to an update is contrary to the use of serverless functions.

With increasing adaptation of cloud computing and cloud storage by enterprises to offload support for application functionalities, improving efficiencies in development, deployment and management thereof has never been as important. For users of serverless functions, more efficient and expedient deployment of serverless function definitions is greatly desired.

SUMMARY

System and computer-implemented method dynamically deploying serverless functions in a cloud architecture utilize a code execution service to receive a request to trigger execution of a serverless function and to determine deployment status information for a previous serverless function version based on the request. The deployment status information is then used to generate a code execution service command for the code execution service to deploy the serverless function.

A computer-implemented method in a cloud architecture including a code execution service configured in accordance with an embodiment of the invention includes receiving a request to trigger execution of a serverless function at the code execution service, the request including a set of deployment parameters associated with the serverless function; determining deployment status information for a previous serverless function version at the code execution service based on the request; and generating a code execution service command for the code execution service to deploy the serverless function based on the deployment status information. In some embodiments, the steps of this method are performed when program instructions contained in a computer-readable storage medium are executed by one or more processors.

A system in a cloud architecture that includes a code execution service, the system including memory and one or more processors configured to receive a request to trigger execution of a serverless function at the code execution service, the request including a set of deployment parameters associated with the serverless function; determine deployment status information for a previous serverless function version at the code execution service based on the request; and generate a code execution service command for the code execution service to deploy the serverless function based on the deployment status information.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
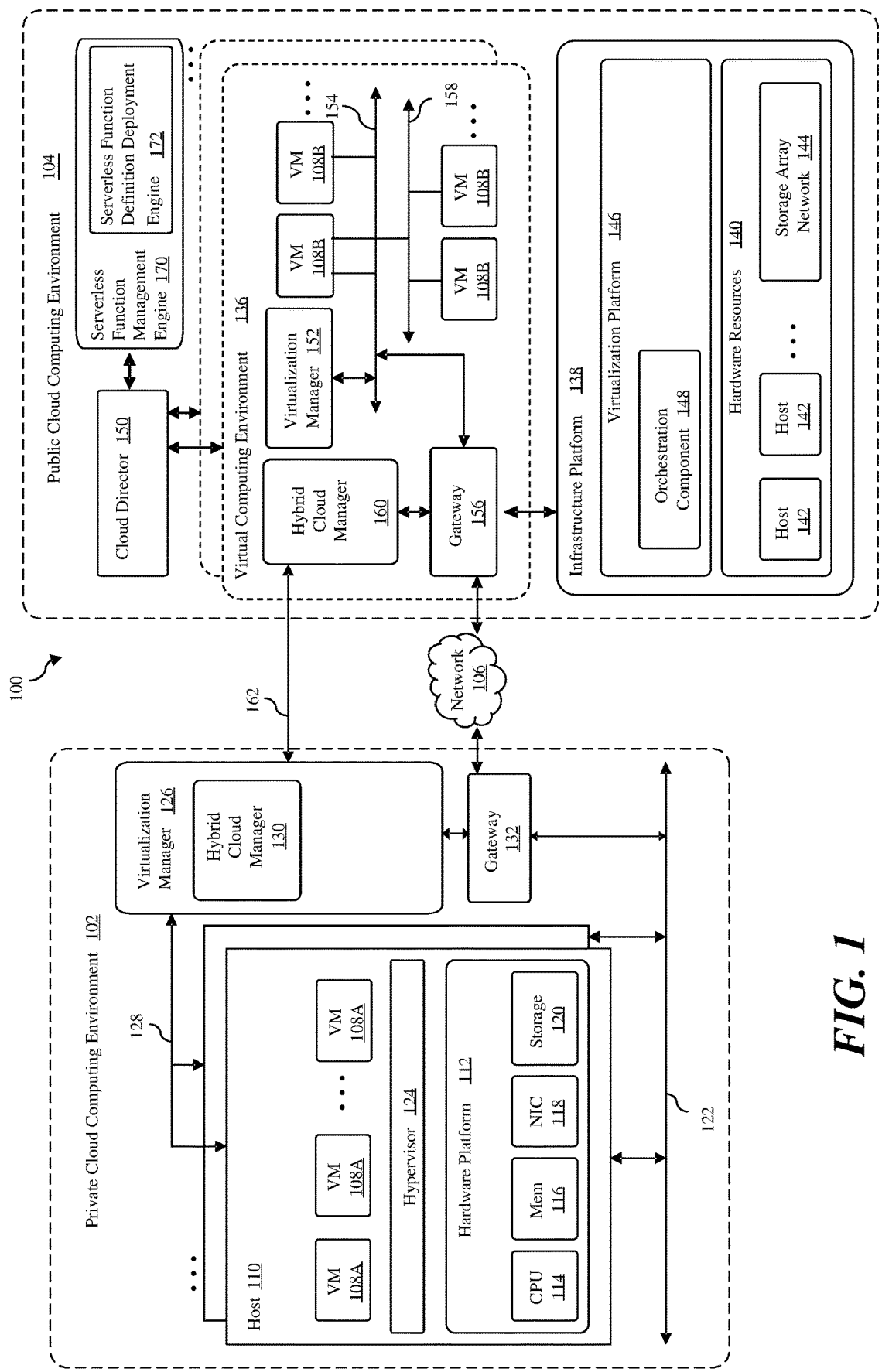
FIG. 1 is a block diagram of a hybrid cloud system that may be used to describe a method and apparatus for dynamically deploying or updating a serverless function in a cloud provider configured in accordance with various aspects of the invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," "one aspect," "an aspect," "various aspects," or similar language means that a particular feature, structure, or characteristic described in connection with the indicated embodiment is included in at least one embodiment of the present invention. Thus, the phrases "in one embodiment," "in an embodiment," "in one aspect," "in an aspect," "in various aspects," and similar language throughout this specification may, but do not necessarily, all refer to the same embodiment.

The following terms will be used in this description. Those skilled in the art would understand that the definitions are not meant to be limiting but are to be used to further provide understanding to the disclosure contained herein.

As used herein, the terms "objects" or "computing objects" may refer to applications, services, hosts, components, sub-components, or any other entity that may communicate with other entities in the cloud architecture, and for which a proxy may be used. These may include hosts and appliances implemented using virtualization technologies provided by VMware, Inc., including VCIs created using VMware ESXi™-based hypervisors. However, objects may be implemented using any other virtualization technologies, including Xen®, Microsoft Hyper-V® and/or Docker virtualization technologies.

FaaS—Function-as-a-service.

Serverless function—"Service traditional" function (such as a small piece of code in some particular language) that is deployed and executed in an FaaS provider.

Serverless function definition ("function definition")—Definition of a serverless function in a service. The function definition may include some attributes (e.g., name, description, runtime, input variables, output variables, memory constraint and so on). Mainly, the Function Definition specifies the actual program code that the user wants to execute.

Serverless function execution ("function run")—Instance of a particular function definition at runtime. The instance is a "clone" of its function Definition but with actual values for input and output variables to be used for the Function Run.

Serverless function service ("function service")—The service with which a user interacts. The function service holds the function definitions created by the user and allows the user to trigger function runs. The function service also allows the user to monitor their progress.

FaaS provider ("cloud computing provider," "cloud service provider," "cloud provider," "code execution service," or "provider")—Entity that executes the code from the function definitions created by the user. Example of providers include AWS Lambdas, Azure Functions, or GCP Cloud Functions.

Serverless function provider function ("FaaS provider function")—Actual representation of a function run in the provider with all the code being executed.

Turning now to FIG. 1, a block diagram of a hybrid cloud system 100, which may also be referred to as a "cloud architecture," in accordance with an embodiment of the invention is shown. The hybrid cloud system 100 includes at least one private cloud computing environment 102 and at least one public cloud computing environment 104 that are connected via a network 106. The hybrid cloud system 100 is configured to provide a common platform for managing and executing workloads seamlessly between the private and public cloud computing environments. In one embodiment, the private cloud computing environment 102 may be controlled and administrated by a particular enterprise or business organization, while the public cloud computing environment 104 may be operated by a cloud computing service provider and exposed as a service available to account holders, such as the particular enterprise in addition to other enterprises. In some embodiments, the private cloud computing environment 102 may be a private or on-premise data center.

The private cloud computing environment 102 and public cloud computing environment 104 of the hybrid cloud system 100 include computing and/or storage infrastructures to support a number of virtual computing instances 108A and 108B. As used herein, the term "virtual computing instance" refers to any software processing entity that can run on a computer system, such as a software application, a software process, a virtual machine (VM), e.g., a VM supported by virtualization products of VMware, Inc., and a software "container", e.g., a Docker container. However, in this disclosure, the virtual computing instances will be described as being virtual machines, although embodiments of the invention described herein are not limited to virtual machines.

Continuing to refer to FIG. 1, the private cloud computing environment 102 of the hybrid cloud system 100 includes one or more host computer systems ("hosts") 110. The hosts may be constructed on a server grade hardware platform 112, such as an x86 architecture platform. As shown, the hardware platform of each host may include conventional components of a computing device, such as one or more processors (e.g., CPUs) 114, system memory 116, a network interface 118, storage system 120, and other I/O devices such as, for example, a mouse and a keyboard (not shown). The processor 114 is configured to execute instructions such as, for example, executable instructions that may be used to perform one or more operations described herein and may be stored in the memory 116 and the storage system 120. The memory 116 is volatile memory used for retrieving programs and processing data. The memory 116 may include, for example, one or more random access memory (RAM) modules. The network interface 118 enables the host 110 to communicate with another device via a communication medium, such as a network 122 within the private cloud computing environment. The network interface 118 may be one or more network adapters, also referred to as a Network Interface Card (NIC). The storage system 120 represents local storage devices (e.g., one or more hard disks, flash memory modules, solid state disks and optical disks) and/or a storage interface that enables the host to communicate with one or more network data storage systems. Example of a storage interface is a host bus adapter (HBA) that couples the host to one or more storage arrays, such as a storage area network (SAN) or a network-attached storage (NAS), as well as other network data storage systems. The storage system 120 is used to store information, such as executable instructions, cryptographic keys, virtual disks, configurations and other data, which can be retrieved by the host.

Each host 110 may be configured to provide a virtualization layer that abstracts processor, memory, storage, and networking resources of the hardware platform 112 into the virtual computing instances, e.g., the virtual machines 108A, that run concurrently on the same host. The virtual machines run on top of a software interface layer, which is referred to herein as a hypervisor 124, that enables sharing of the hardware resources of the host by the virtual machines. One example of the hypervisor 124 that may be used in an embodiment described herein is a VMware ESXi™ hypervisor provided as part of the VMware vSphere® solution made commercially available from VMware, Inc. The hypervisor 124 may run on top of the operating system of the host or directly on hardware components of the host. For other types of virtual computing instances, the host may include other virtualization software platforms to support those virtual computing instances, such as Docker virtualization platform to support software containers.

The private cloud computing environment 102 includes a virtualization manager 126 that communicates with the hosts 110 via a management network 128. In one embodiment, the virtualization manager 126 is a computer program that resides and executes in a computer system, such as one of the hosts, or in a virtual computing instance, such as one of the virtual machines 108A running on the hosts. One example of the virtualization manager 126 is the VMware vCenter Server® product made available from VMware, Inc. The virtualization manager 126 is configured to carry out administrative tasks for the private cloud computing environment, including managing the hosts, managing the VMs running within each host, provisioning VMs, migrating VMs from one host to another host, and load balancing between the hosts.

The virtualization manager 126 includes a hybrid cloud manager 130. In general, the hybrid cloud manager 130 is responsible for managing and integrating computing resources provided by the private cloud computing environment 102 with computing resources provided by the public cloud computing environment 104 to form a unified "hybrid" computing platform. The hybrid cloud manager 130 may further be configured to deploy virtual computing instances, e.g., virtual machines 108A, in the private cloud computing environment; transfer VMs from the private cloud computing environment to the public cloud computing environment; and perform other "cross-cloud" administrative tasks.

The hybrid cloud manager 130 is configured to control network traffic into the network 106 via a gateway device 132, which may be implemented as a virtual appliance. The gateway device 132 is configured to provide the virtual machines 108A and other devices in the private cloud computing environment 102 with connectivity to external devices via the network 106. The gateway device 132 may manage external public Internet Protocol (IP) addresses for the virtual machines 108A and route traffic incoming to and outgoing from the private cloud computing environment and provide networking services, such as firewalls, network address translation (NAT), dynamic host configuration protocol (DHCP), load balancing, and virtual private network (VPN) connectivity over the network 106.

In one implementation, the hybrid cloud manager 130 is a module or plug-in to the virtualization manager 126, although other implementations may be used, such as a separate computer program executing in any computer system or running in a virtual machine in one of the hosts. One example of the hybrid cloud manager 130 is the VMware® HCX™ product made available from VMware, Inc.

The public cloud computing environment 104 of the hybrid cloud system 100 is configured to dynamically provide an enterprise (or users of an enterprise) with one or more virtual computing environments 136 in which an administrator of the enterprise may provision virtual computing instances, e.g., the virtual machines 108B, and install and execute various applications in the virtual computing instances. The public cloud computing environment includes an infrastructure platform 138 upon which the virtual computing environments can be executed. In the particular embodiment of FIG. 1, the infrastructure platform includes hardware resources 140 having computing resources (e.g., hosts 142), storage resources (e.g., one or more storage array systems, such as a storage area network (SAN) 144), and networking resources (not illustrated), and a virtualization platform 146, which is programmed and/or configured to provide the virtual computing environments 136 that support the virtual machines 108B across the hosts 142. The virtualization platform may be implemented using one or more software programs that reside and execute in one or more computer systems, such as the hosts 142, or in one or more virtual computing instances, such as the virtual machines 108B, running on the hosts.

In one embodiment, the virtualization platform 146 includes an orchestration component 148 that provides infrastructure resources to the virtual computing environments 136 responsive to provisioning requests. The orchestration component may instantiate VMs according to a requested template that defines one or more VMs having specified virtual computing resources (e.g., compute, networking and storage resources). Further, the orchestration component may monitor the infrastructure resource consumption levels and requirements of the virtual computing environments and provide additional infrastructure resources to the virtual computing environments as needed or desired. In one example, similar to the private cloud computing environment 102, the virtualization platform may be implemented by running, on the hosts 142, VMware ESXi™-based hypervisor technologies provided by VMware, Inc. However, the virtualization platform may be implemented using any other virtualization technologies, including Xen®, Microsoft Hyper-V® and/or Docker virtualization technologies, depending on the virtual computing instances being used in the public cloud computing environment 104.

In one embodiment, the public cloud computing environment 104 may include a cloud director 150 that manages allocation of virtual computing resources to an enterprise. The cloud director 150 may be accessible to users via a REST (Representational State Transfer) API (Application Programming Interface) or any other client-server communication protocol. The cloud director 150 may authenticate connection attempts from the enterprise using credentials issued by the cloud computing provider. The cloud director 150 receives provisioning requests submitted (e.g., via REST API calls) and may propagate such requests to the orchestration component 148 to instantiate the requested virtual machines (e.g., the virtual machines 108B). One example of the cloud director is the VMware vCloud Director® product from VMware, Inc. The public cloud computing environment 104 may be VMware cloud (VMC) on Amazon Web Services (AWS).

In one embodiment, at least some of the virtual computing environments 136 may be configured as virtual data centers. Each virtual computing environment includes one or more virtual computing instances, such as the virtual machines 108B, and one or more virtualization managers 152. The virtualization managers 152 may be similar to the virtualization manager 126 in the private cloud computing environment 102. One example of the virtualization manager 152 is the VMware vCenter Server® product made available from VMware, Inc. Each virtual computing environment may further include one or more virtual networks 154 used to communicate between the virtual machines 108B running in that environment and managed by at least one networking gateway device 156, as well as one or more isolated internal networks 158 not connected to the gateway device 156. The gateway device 156, which may be a virtual appliance, is configured to provide the virtual machines 108B and other components in the virtual computing environment 136 with connectivity to external devices, such as components in the private cloud computing environment 102 via the network 106. The gateway device 156 operates in a similar manner as the gateway device 132 in the private cloud computing environment.

In one embodiment, each virtual computing environments 136 includes a hybrid cloud manager 160 configured to communicate with the corresponding hybrid cloud manager 130 in the private cloud computing environment 102 to enable a common virtualized computing platform between the private and public cloud computing environments. The hybrid cloud manager 160 may communicate with the hybrid cloud manager 130 using Internet-based traffic via a VPN tunnel established between the gateways 132 and 156, or alternatively, using a direct connection 162. The hybrid cloud manager 160 and the corresponding hybrid cloud manager 130 facilitate cross-cloud migration of virtual computing instances, such as virtual machines 108A and 108B, between the private and public computing environments. This cross-cloud migration may include both "cold migration" in which the virtual machine is powered off during migration, as well as "hot migration" in which the virtual machine is powered on during migration.

Referring still to FIG. 1, a serverless function management engine 170 may be used to provide serverless function control and deployment as well as handle requests from users to interact with serverless function deployment. For example, the serverless function management engine 170 may be used to provide an interface to determine status of deployment of serverless function definitions and execution of serverless functions. In one embodiment, the serverless function management engine 170 may communicate with the cloud director 150 to implement automation and management of hybrid cloud computing resources, which includes on-premise virtual computing resources as well.

Although a specific placement of the serverless function management engine 170 is provided as an example, those skilled in the art would understand that the functionality described herein for dynamically deploying/updating serverless function definitions by the serverless function management engine 170 may be provided as a part of one or more other components, depending on the implementation. Thus, the placement of the serverless function management engine 170 as described herein is provided as an example and is not intended to be limiting.

In one aspect of the disclosed invention, a serverless function definition deployment engine 172 in the serverless function management engine 170 may be used to track when a serverless function definition has to be deployed or redeployed depending on a requested cloud computing provider or region, or changes in serverless function code or configuration, as described herein.

Figure 2:
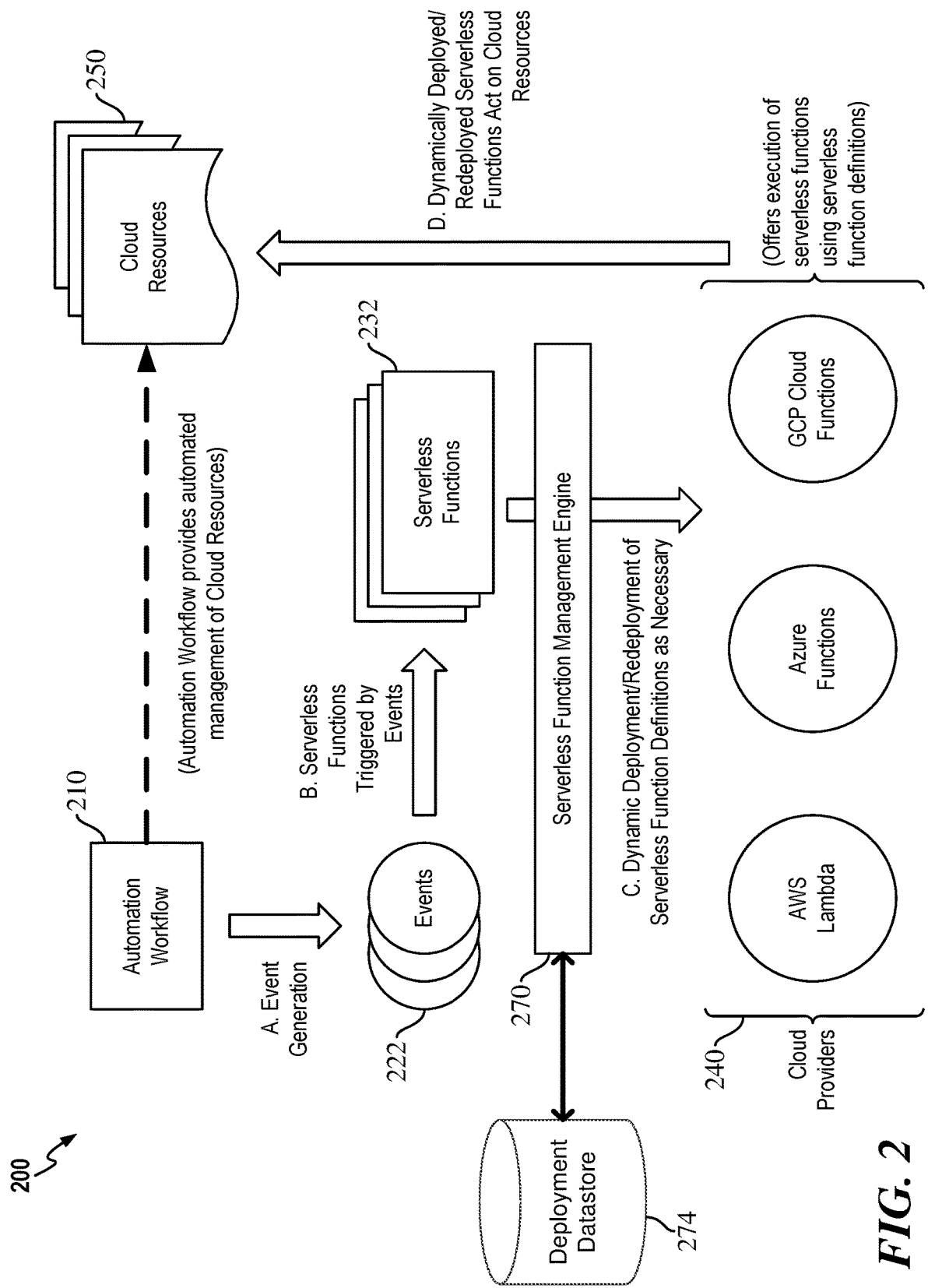
FIG. 2 is a block diagram of an overview of how various aspects of the method and apparatus for dynamically deploying or updating a serverless function in a cloud provider, configured in accordance with the invention, may be used to support automation workflows in the context of cloud management.

FIG. 2 illustrates an overview 200 of how various aspects of the present invention may be used to support automation workflows such as an automation workflow 210 in the context of cloud management. The automation workflow 210 may be created by a user to manage cloud resources 250.

The automation workflow 210, which may be thought of as a script conceptually, includes a series of automation steps. For example, automation steps may include provisioning, deleting, and configuring or reconfiguring one or more VMs. The automation steps may further include contacting third party APIs by any kind of integration, any management operations of virtual infrastructure in general, etc. One or more events 222 may be generated by the automation steps in the automation workflow 210, as shown in step "A" of FIG. 2.

The events 222 will in turn trigger execution requests of serverless functions 232, as shown in step "B," where the serverless functions would be executed by one or more cloud providers 240 (also referred to as "FaaS providers" herein). Examples shown are the providers previously mentioned, including AWS Lambdas, Azure Functions, or GCP Functions. As described herein, before a serverless function may be executed at a cloud provider, its serverless function definition must be deployed at the cloud provider.

In accordance with various aspects of the invention, a serverless function management engine 270 containing a serverless function definition deployment engine such as the serverless function definition deployment engine 172 contained in the serverless function management engine 170 may control what is passed to the cloud providers 240 to optimize deployment/redeployment of serverless function definitions, as shown in step "C" of FIG. 2. The serverless function management engine 270 may maintain and use information in a deployment datastore 274 to determine deployment status for serverless function definitions, including determining any changes that have been made after a serverless function definition has been deployed. Thus, a serverless function definition may be dynamically deployed/redeployed only as necessary to support execution (creation of one or more instance) of the serverless function defined thereby. It should be readily understood by those of ordinary skill in the art that deployment/redeployment of a serverless function definition may only involve deployment/redeployment of a portion of the serverless function definition. Updates/changes to the configuration of the serverless function definition should also be considered as a deployment/redeployment of a portion of the serverless function definition.

Once deployed/redeployed as necessary to a particular cloud provider in the cloud providers 240 at which the execution request is directed, the serverless function definition may be used by that cloud provider to create one or more instances of the serverless function, as illustrated by step "D." These serverless function instances interact with the cloud resources 250 as described herein.

Those of ordinary skill in the art will understand that the description provided for the automation workflow 210 in the context of cloud management may be genericized to apply to any kind of automation steps. Thus, the various aspects of the method and apparatus for dynamically deploying or updating a serverless function in a cloud provider described herein may be applied to any workflow that may generate events in response to which one or more serverless functions could be triggered.

Figure 3:
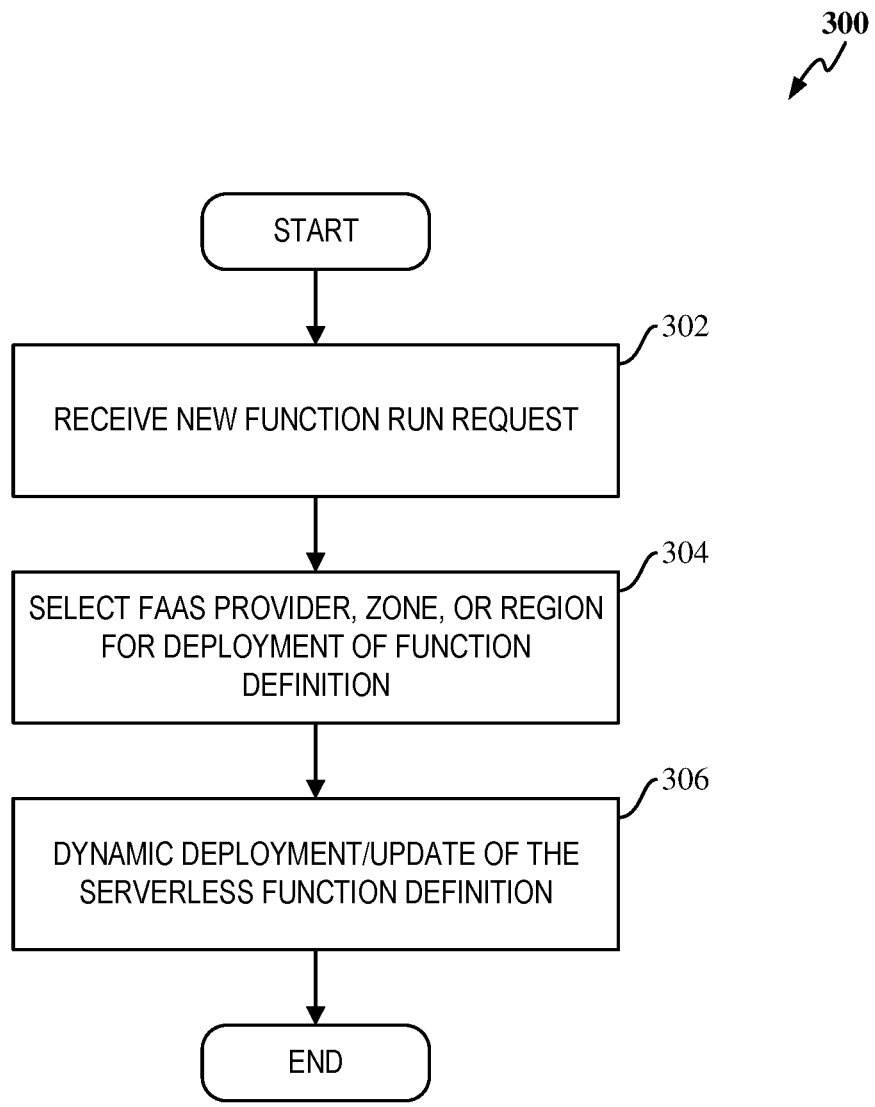
FIG. 3 is a flow diagram for executing a serverless function configured in accordance with various aspects of the invention.
Figure 4:
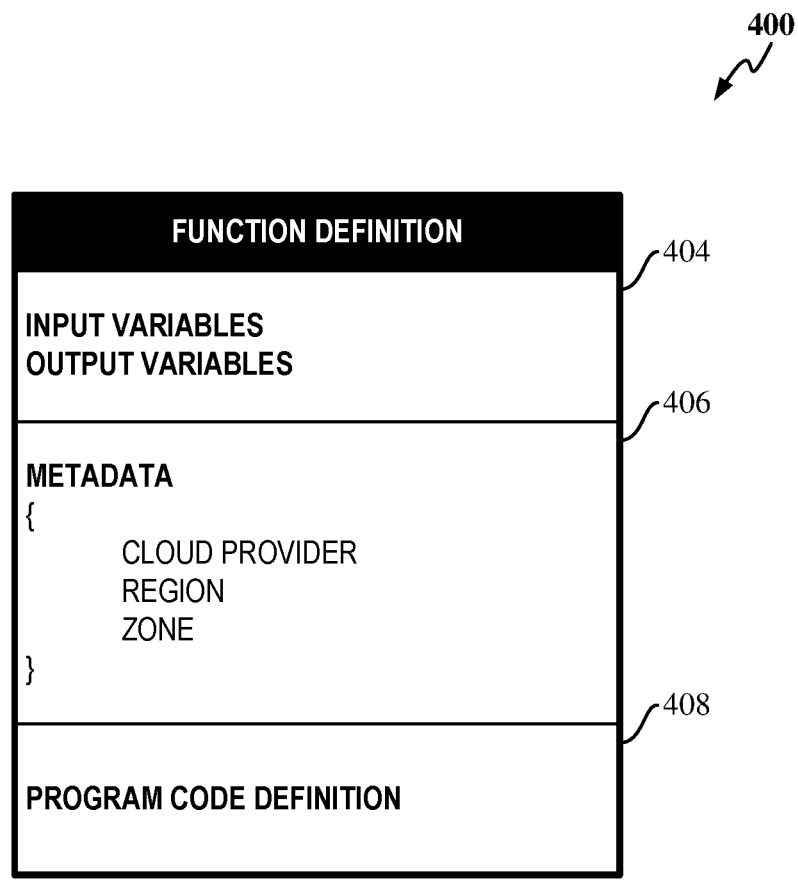
FIG. 4 is a diagram of a serverless function definition that may be deployed as part of the flow diagram of FIG. 3.

FIG. 3 illustrates a serverless function execution process 300 for a serverless function management engine such as the serverless function management engine 170 configured in accordance with various aspect of the invention where, starting at step 302, the serverless function management engine receives a new request to run a serverless function from a user. In one aspect of the disclosed approach, the serverless function will be based on a serverless function definition that contains program code as well as attributes associated with the execution of the program code is provided to the serverless function management engine. The attributes may include input/output variables used by the program code. FIG. 4 illustrates a serverless function definition 400 configured in accordance with various aspects of the invention that includes input/output variables 404 that may be used when program code 408 is executed.

The serverless function definition 400 may also include metadata 406 that indicates on which platforms the program code 408 may be executed. The metadata 406 may indicate whether the program code 408 is platform agnostic such that the program code 408 may be executed at any cloud provider. The metadata 406 may also indicate that the program code 408 requires execution at a particular cloud provider and may also indicates such details as a region or a zone for that particular cloud provider. For example, program code that provides functions as e-mailing users about deployment status for a virtual machine may be platform agnostic, while program code that contains AWS database query command or utilizes AWS-specific API would be cloud provider specific.

Returning to FIG. 3, the new request to run the serverless function is received by the serverless function management engine. Operation then continues with step 304.

At step 304, the serverless function management engine performs placement selection where a specific FaaS provider is selected for the execution of the serverless function. In one aspect of the invention, a placement selection algorithm may be used to select the FaaS provider. For example, the placement selection algorithm may consider the cost, capacity/load, and/or user-specified requests of the FaaS provider. Specification of the FaaS provider may include the deployment zone or region for the selected FaaS provider. Once the function run placement has been selected, operation continues with step 306.

Figure 5:
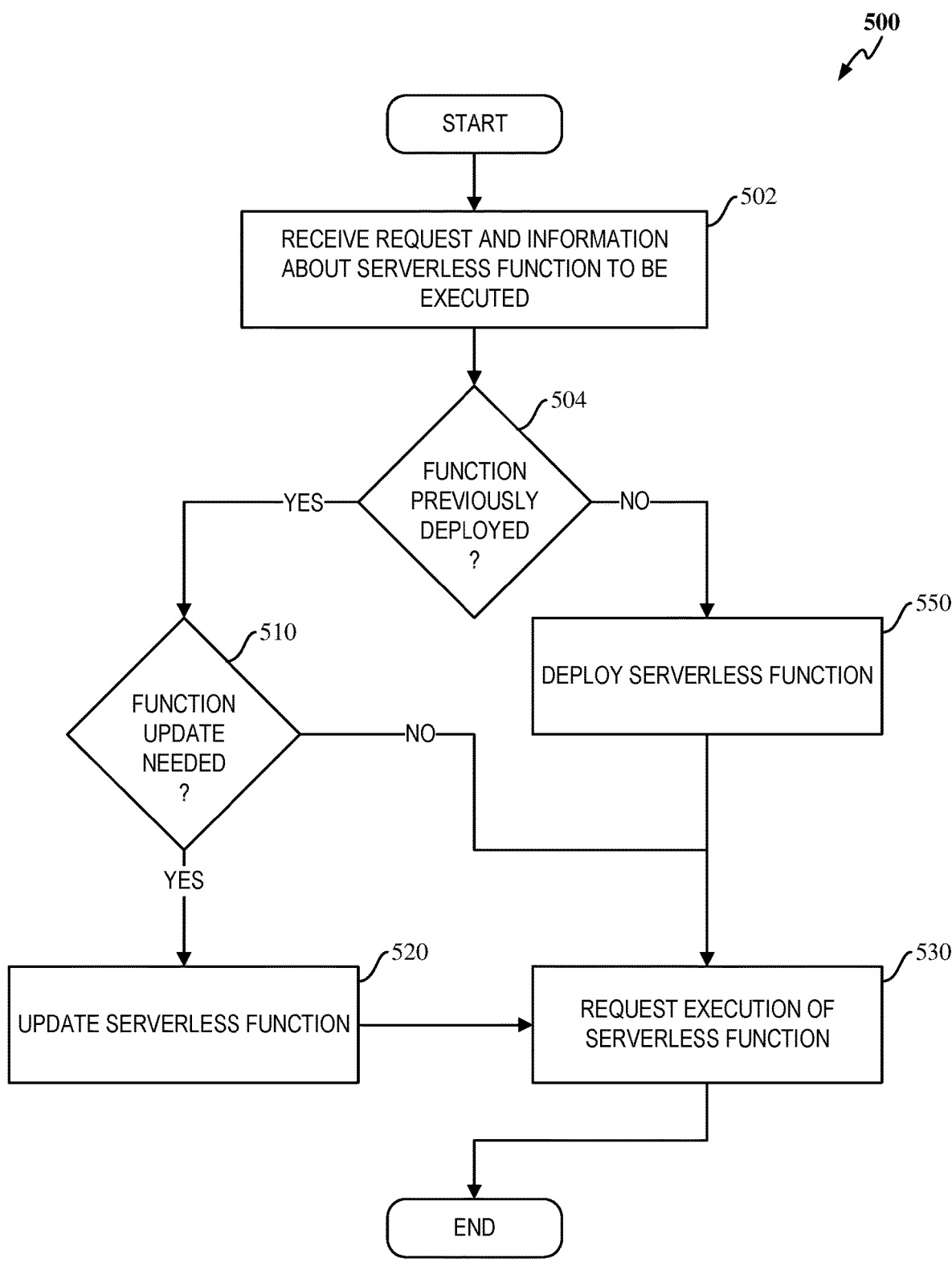
FIG. 5 is a flow diagram for dynamically deploying or updating a serverless function definition in a cloud provider configured in accordance with various aspects of the invention as part of the flow diagram of FIG. 3.

At step 306, dynamic deployment/update of the serverless function definition may performed. FIG. 5 illustrates a serverless function definition deployment process 500 for the serverless function management engine configured in accordance with various aspect of the invention.

At step 502, the serverless function management engine has received a request to trigger execution (a run) of the serverless function definition, as described at step 302 of FIG. 3, and selected placement of the serverless function definition, as described at step 304 of FIG. 3. As described, in one aspect of the disclosed approach, the request includes a set of execution parameters that may include specific values for the input variables defined in the attributes to be used in the particular run. The request may also include a set of deployment parameters associated with the deployment of the serverless function definition. The set of deployment parameters may include, for example, such function configurations as: memory constraints, function timeout, and custom settings. In addition, the deployment parameters may specify other parameters, such as a cloud provider (zone or region) for execution of the serverless function. Using this information, the serverless function management engine may utilize a placement selection process to choose a specific cloud provider (FaaS provider) at which to execute the serverless function. In general, the set of deployment parameters may specific everything needed to deploy the serverless function in an FaaS provider. In addition, the deployment parameters may include a cloud computing provider identifier that identifies a specific cloud services provider (FaaS provider). Once the chosen cloud provider has been specified, operation then continues with step 504.

At step 504, a serverless function definition deployment engine such as the serverless function definition deployment engine 172 will determine deployment status information for the serverless function, represented by the serverless function definition at the FaaS provider. In one aspect of the disclosed approach, the serverless function definition deployment engine may query a database such as the deployment datastore 274 to determine, for example, if the serverless function definition has previously been deployed in the FaaS provider. If the serverless function definition has previously been deployed, operations will continue with step 510. Otherwise, if the serverless function definition has not been previously deployed, operations will continue with step 550.

At step 510, where the serverless function definition has previously been deployed (where the serverless function definition contains computing code that may be executed that may be referred to as "previous computing code" as it has been deployed previously), the serverless function definition deployment engine will determine if the serverless function has to be updated. In one aspect of the disclosed approach, the serverless function definition deployment engine queries the database to determine if the serverless function has to be updated. Based on the request, the query may return a record associated with the serverless function that includes serverless function code ("computing code") or metadata/configuration ("configuration parameters") for a previous serverless function version at the code execution service. In another aspect of the disclosed approach, in addition to returning an indication that the serverless function has previously been deployed, the query of the database at step 504 may also return an indication of whether the serverless function needs to be updated. For example, if the previous computing code version is outdated in the sense that the current computing code contained in the serverless function definition is newer, then the serverless function may be updated. In one aspect of the disclosed approach, a difference between computing code versions may be determined using checksums of the previous computing code version and the current computing code version contained in the serverless function definition to be evaluated. In addition, similar to how checksums may be used to determine differences between computing code versions, checksums may be used to determine differences in configuration parameters associated with serverless functions (e.g., differences between a previous configuration parameters version and the current configuration parameters being evaluated). If the serverless function should be updated, then operations will continue with step 520. However, if the serverless function does not need to be updated, then operations will continue with step 530.

At step 520, where it has been determined that the serverless function that has been previously deployed needs to be updated, the serverless function definition deployment engine will update the serverless function with the FaaS provider. In one aspect of the disclosed approach, the serverless function definition deployment engine will update the serverless function by sending the changes to the FaaS provider. For example, changes to the serverless function definition are sent to the FaaS provider and then a new instance of the serverless function is created. The updated function is updated and passed necessary inputs for execution. Or, if the deployed function in the FaaS provider needs only reconfiguration, then the deployed function is reconfigured and passed necessary inputs for execution. Typically, old instances may be deleted when new instances are deployed. Depending on the specific implementation of the FaaS provider, the deletion may be explicitly triggered. The deletion may also be implicit based on a timeout because the old instance will not be used after the new instance is deployed.

At step 530, where the serverless function has previously been deployed and does not need to be updated, the serverless function definition deployment engine will request execution of the serverless function. In one aspect of the disclosed approach, the serverless function definition deployment engine will deploy the serverless function by triggering a function run of the serverless function at the serverless function provider (i.e., the code execution service) using a code execution service command. The code execution service command is a command that the code execution service recognizes to trigger the function run of the serverless function. For example, the FaaS provider creates an instance of the function definition and passes for execution the program code contained therein using the actual values. The instance is referred to as a FaaS provider function. Usually there is only one of FaaS provider function, no matter the number of requests for function runs, which handles the run requests. Of course, this may be particular to the specific FaaS provider. Some implementations may use only one instance of the function, while others may use multiple instances to scale and handle the incoming requests. Operation then comes to an end.

At step 550, where the serverless function has not been deployed before, the serverless function definition deployment engine will deploy the serverless function definition to the selected cloud provider. In one aspect of the disclosed approach, the serverless function definition deployment engine will send the code for the serverless function and the parameters needed for its execution to the FaaS provider. Operation then proceeds to step 530, where the serverless function definition deployment engine will request execution of the serverless function.

Figure 6:
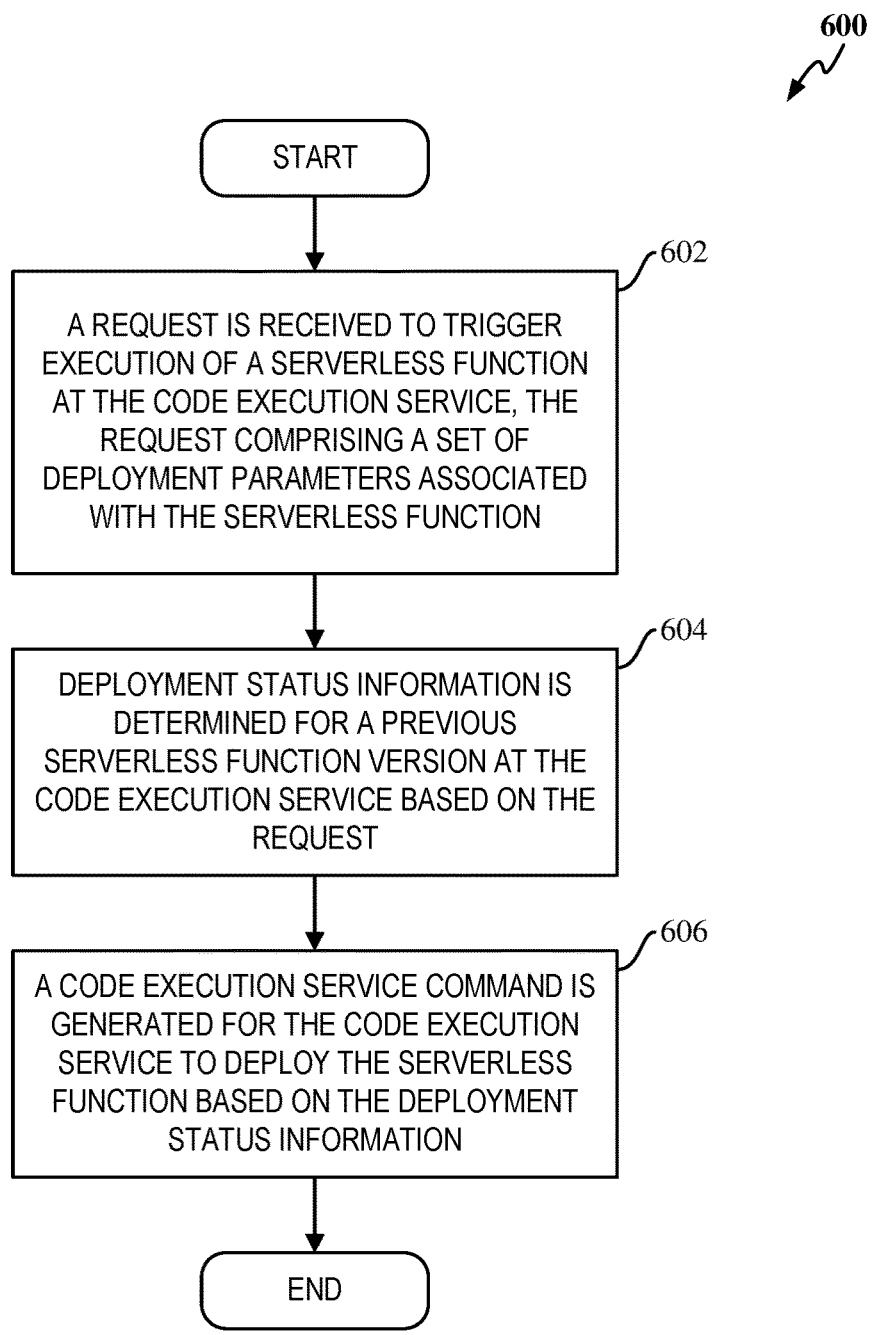
FIG. 6 is a flow diagram of a computer-implemented method for dynamically deploying serverless functions in a cloud architecture that includes a code execution service configured in accordance with various aspects of the invention.

A computer-implemented method for dynamically deploying serverless functions in a cloud architecture including a code execution service in accordance with various aspects of the invention, is described with reference to a flow diagram 600 of FIG. 6. At block 602, a request is received to trigger execution of a serverless function at the code execution service, the request including a set of deployment parameters associated with the serverless function. At block 604, deployment status information is determined for a previous serverless function version, which includes previous computing code, is at the code execution service based on the request. At block 606, a code execution service command is generated for the code execution service to deploy the serverless function based on the deployment status information.

Although the operations of the approaches herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid-state memory, magnetic tape, a removable computer diskette, a random-access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method in a cloud architecture comprising a code execution service running on hardware resources of the cloud architecture, the method comprising:
    receiving a request to trigger execution of a serverless function at the code execution service, the request comprising a set of deployment parameters associated with the serverless function, wherein the set of deployment parameters included in the request comprises a cloud computing provider identifier for the code execution service;
    determining deployment status information for a previous serverless function version at the code execution service based on the request, including determining whether a record of the previous serverless function instance exists based on the cloud computing provider identifier included in the request; and
    generating a code execution service command for the code execution service to deploy the serverless function based on the deployment status information.

2. The method of claim 1, further comprising:
    transmitting the code execution service command to the code execution service; and
    issuing an execution command for the serverless function to the code execution service.

3. The method of claim 1, wherein the set of deployment parameters included in the request comprises a zone of a cloud computing provider for execution of the serverless function.

4. The method of claim 1, wherein the serverless function comprises computing code executable by the code execution service, wherein the previous serverless function instance comprises a previous computing code version executable by the code execution service, and wherein the generating of the code execution service command to deploy the serverless function based on the deployment status information comprises:
    determining a difference based on the computing code of the serverless function and the previous computing code version; and
    generating a command to update the previous computing code version with the computing code of the serverless function based on the difference.

5. The method of claim 4, wherein the determining of the difference based on the computing code of the serverless function and the previous computing code version comprises:
    calculating a first checksum from the computing code of the serverless function;
    calculating a second checksum from the previous computing code version; and
    comparing the first checksum and the second checksum.

6. The method of claim 1, wherein the set of deployment parameters comprises configuration parameters associated with the serverless function, wherein the record of the previous serverless function instance comprises a previous configuration parameters version associated with the previous serverless function instance, and wherein the generating of the code execution service command to deploy deployment of the serverless function based on the deployment status information comprises:
    determining a difference based on the configuration parameters associated with the serverless function and the previous configuration parameters version; and
    generating a command to update the previous configuration parameters version with the configuration parameters associated with the serverless function based on the difference.

7. The method of claim 6, wherein the determining of the difference based on the configuration parameters associated with the serverless function and the previous configuration parameters version comprises:
    calculating a first checksum from the configuration parameters associated with the serverless function;
    calculating a second checksum from the previous configuration parameters version; and
    comparing the first checksum and the second checksum.

8. A non-transitory computer-readable storage medium containing program instructions for dynamically deploying serverless functions in a cloud architecture comprising a code execution service running on hardware resources of the cloud architecture, wherein execution of the program instructions by one or more processors causes the one or more processors to perform steps comprising:
  receiving a request to trigger execution of a serverless function at the code execution service, the request comprising a set of deployment parameters associated with the serverless function, wherein the set of deployment parameters included in the request comprises a cloud computing provider identifier for the code execution service;
  determining deployment status information for a previous serverless function version at the code execution service based on the request, including determining whether a record of the previous serverless function instance exists based on the cloud computing provider identifier included in the request; and
  generating a code execution service command for the code execution service to deploy the serverless function based on the deployment status information.

9. The computer-readable storage medium of claim 8, wherein the execution of the program instructions by one or more processors further causes the one or more processors to perform steps comprising:
  transmitting the code execution service command to the code execution service; and
  issuing an execution command for the serverless function to the code execution service.

10. The computer-readable storage medium of claim 8, wherein the set of deployment parameters included in the request comprises a zone of a cloud computing provider for execution of the serverless function.

11. The computer-readable storage medium of claim 8, wherein the serverless function comprises computing code executable by the code execution service, wherein the previous serverless function instance comprises a previous computing code version executable by the code execution service, and wherein the execution of the program instructions by one or more processors further causes the one or more processors to perform steps comprising:
  determining a difference based on the computing code of the serverless function and the previous computing code version; and
  generating a command to update the previous computing code version with the computing code of the serverless function based on the difference.

12. The computer-readable storage medium of claim 11, wherein the execution of the program instructions by one or more processors further causes the one or more processors to perform steps comprising:
  calculating a first checksum from the computing code of the serverless function;
  calculating a second checksum from the previous computing code version; and
  comparing the first checksum and the second checksum.

13. The computer-readable storage medium of claim 8, wherein the set of deployment parameters comprises configuration parameters associated with the serverless function, wherein the record of the previous serverless function instance comprises a previous configuration parameters version associated with the previous serverless function instance, and wherein execution of the program instructions by one or more processors further causes the one or more processors to perform steps comprising:
  determining a difference based on the configuration parameters associated with the serverless function and the previous configuration parameters version; and
  generating a command to update the previous configuration parameters version with the configuration parameters associated with the serverless function based on the difference.

14. The computer-readable storage medium of claim 13, wherein execution of the program instructions by one or more processors further causes the one or more processors to perform steps comprising:
  calculating a first checksum from the configuration parameters associated with the serverless function;
  calculating a second checksum from the previous configuration parameters version; and
  comparing the first checksum and the second checksum.

15. A system in a cloud architecture comprising a code execution service running on hardware resources of the cloud architecture, the system comprising:
  memory; and
  one or more processors configured to:
    receive a request to trigger execution of a serverless function at the code execution service, the request comprising a set of deployment parameters associated with the serverless function, wherein the set of deployment parameters included in the request comprises a cloud computing provider identifier for the code execution service;
    determine deployment status information for a previous serverless function version at the code execution service based on the request, including determining whether a record of the previous serverless function instance exists based on the cloud computing provider identifier included in the request; and
    generate a code execution service command for the code execution service to deploy the serverless function based on the deployment status information.

16. The system of claim 15, wherein the one or more processors are further configured to:
  transmit the code execution service command to the code execution service; and
  issue an execution command for the serverless function to the code execution service.

17. The system of claim 15, wherein the set of deployment parameters included in the request comprises a zone of a cloud computing provider for execution of the serverless function.

18. The system of claim 15, wherein the serverless function comprises computing code executable by the code execution service, wherein the previous serverless function instance comprises a previous computing code version executable by the code execution service, and wherein the one or more processors are further configured to:
  determine a difference based on the computing code of the serverless function and the previous computing code version; and
  generate a command to update the previous computing code version with the computing code of the serverless function based on the difference.

19. The system of claim 18, wherein the one or more processors are further configured to:
  calculate a first checksum from the computing code of the serverless function;
  calculate a second checksum from the previous computing code version; and
  compare the first checksum and the second checksum.

20. The system of claim 15, wherein the set of deployment parameters comprises configuration parameters associated with the serverless function, wherein the record of the previous serverless function instance comprises a previous configuration parameters version associated with the previous serverless function instance, and wherein the one or more processors are further configured to:
- determine a difference based on the configuration parameters associated with the serverless function and the previous configuration parameters version; and
- generate a command to update the previous configuration parameters version with the configuration parameters associated with the serverless function based on the difference.

* * * * *